United States Patent [19]

Sugisawa et al.

[11] Patent Number: 5,208,062
[45] Date of Patent: May 4, 1993

[54] METHOD FOR PRODUCING ROUX

[75] Inventors: Ko Sugisawa, Nara; Masanori Yamamoto, Kaizuka; Masaru Shibuki; Yoshitaka Hirano, both of Nara; Koichi Shibahara, Toyonaka; Nozomu Tanihara, Nara, all of Japan

[73] Assignee: House Food Industrial Company Limited, Higashiosaka, Japan

[21] Appl. No.: 614,975

[22] Filed: Nov. 19, 1990

Related U.S. Application Data

[63] Continuation of Ser. No. 191,178, May 6, 1988, abandoned.

[30] Foreign Application Priority Data

May 8, 1987 [JP] Japan .................. 62-111967

[51] Int. Cl.$^5$ ........................... A23P 1/12
[52] U.S. Cl. ................... 426/589; 426/601; 426/618; 426/504; 426/516
[58] Field of Search ............ 426/589, 601, 618, 504, 426/516

[56] References Cited

U.S. PATENT DOCUMENTS 4,363,824 12/1982 Willi et al. ..................... 426/589
4,492,713 1/1985 Chauvin ......................... 426/622

FOREIGN PATENT DOCUMENTS 55-102369  8/1980  Japan .
59-159757  9/1984  Japan .
 59-25656 12/1984  Japan .
61-181355  8/1986  Japan .
61-289838 12/1986  Japan .
61-289869 12/1986  Japan .
 2186176  8/1987  United Kingdom .

Primary Examiner—Steve Alvo
Attorney, Agent, or Firm—Burns, Doane, Swecker & Mathis

[57] ABSTRACT

A method for producing roux comprises heating and kneading a starting material comprised of fats and oils and farinaceous materials in a twin-screw extruder at a temperature of 60° to 220° C. for 25 seconds to 25 minutes. This method makes it possible to obtain roux having high quality within a short period of time by a very simple process.

15 Claims, No Drawings

METHOD FOR PRODUCING ROUX

This application is a continuation of application Ser. No. 07/191,178, filed May 6, 1988, now abandoned.

BACKGROUND OF THE INVENTION (1) Field of the Invention

The present invention relates to a method for producing roux and more particularly to a method for producing roux, such as roux for curry and stew, by using a twin-screw extruder.

(2) Prior Art

Roux, such as for curry, stew and white sauce, has been produced by heating and kneading a starting material mainly comprised of wheat flour, fats and oils and seasonings and has an inherent color and texture due to the fusion of the wheat flour and the fats and oils used. Moreover, the seasonings impart pleasing taste and flavor to the roux, so that roux has been widely used as a basic material for foods or to impart color and/or taste to cooked foods.

Generally, it has been known that characteristic properties of roux such as color, taste and flavor are greatly influenced by the heat condition during the production thereof. Particularly, in order to obtain roux having rich taste and flavor, the roux must be uniformly heated at an elevated temperature. Nevertheless, the heating of roux has conventionally been carried out by using a directly heated roasting kettle or a steam heated roasting kettle and therefore, there are various problems to be solved.

The starting material must be sufficiently and uniformly heated at an elevated temperature in order to obtain roux having good taste and flavor by using such an kettle. However, the heating efficiency of such an kettle is inferior and as a result, prolonged heating is required to obtain roux having the desired taste and flavor. Moreover, in such cases, the heating of the roux in the middle of the kettle is particularly insufficient. This problem cannot be completely solved even if the starting material is sufficiently agitated in an kettle provided with blades for agitation. Thus, the quality of the resultant roux varies widely. The foregoing problem becomes more severe as the viscosity of the roux increases. In addition to the above problems, when roux is heated by such a roasting kettle, other problems also arise regarding, for example, energy cost, worker's safety and health.

SUMMARY OF THE INVENTION

As briefly discussed above, the conventional method for heating the starting material for roux using an kettle for roasting suffers from various disadvantages. Therefore, there has been a great need for the development of new methods for producing roux.

Accordingly, a purpose of the present invention is to provide a method which makes it possible to produce roux having particularly excellent taste and flavor at a high yield.

The inventors of this invention have conducted various studies to develop such a method for producing roux and have accomplished the present invention based on a finding that the aforementioned drawbacks can effectively be eliminated by heating and kneading the starting material of roux at a desired temperature for a desired time by using a twin-screw extruder.

The aforementioned and other purposes of the present invention can effectively be achieved by providing a method for producing roux comprising heating and kneading a starting material comprised of fats and oils and farinaceous materials in a twin-screw extruder at 60° to 220° C. for 25 seconds to 25 minutes.

DETAILED EXPLANATION OF THE INVENTION

The starting material used in the invention for producing roux mainly comprises fats and oils and farinaceous materials. As such fats and oils, any edible fats and oils can be used, but it is general to use, for instance, tallow, palm oil, lard and butter. On the other hand, examples of farinaceous materials include wheat flour such as strong flour, medium flour and soft flour, other various starches and mixtures thereof. In addition, the starting material can contain certain additives appropriately selected from the group consisting of common salt, sugar, seasonings, a variety of spices such as curry powder and pepper, soy sauce, worcester sauce, milk and tomato puree, depending on the kind and application of the roux. The starting material can also comprise other additives such as gum and emulsifiers if necessary.

In the present invention, the amount of the fats and oils is not less than 8% by weight (hereunder simply referred to as "%"), preferably 15 to 50% on the basis of the total weight of the starting material. In this connection, if it is less than 8%, the flowability of the starting material processed in a twin-screw extruder becomes extremely lower and, as a result, the extrudability of the starting material in the extruder is adversely affected, whereby the solubility of the product roux during cooking is apt to be lowered. However, if it is not less than 15%.by weight, the flowability, the extrudability and the solubility become good. Furthermore, if it is not less than 18% by weight, the three properties become better.

On the other hand, in case where seasonings are added to the starting material, if the amount of the fats and oils is more than 50% by weight, the taste and flavor of the roux obtained by using the twin-screw extruder are deteriorated. However, if it is not more than 50% by weight, the taste and flavor become good and if not more than 45% by weight, the properties become better. Therefore, to specify the content of fats and oils in the starting material is of primary importance for stable treatment of the material in a twin-screw extruder, to improve the solubility of the resultant roux during cooking and to obtain roux having good quality.

When a starting material containing not more than 30% of fats and oils, is treated by a conventional method using a roasting kettle, the flowability of the starting material becomes very low during heating due to the deficiency of fats and oils and, therefore, the starting material can not be agitated and an acceptable roux can not be produced. Moreover, the low flowability of starting material makes the operation for transferring the roasted starting material to the next process more difficult. On the contrary, the use of a twin-screw extruder as in the present invention makes it possible to treat a starting material having such a low fats and oils content, preferably 15 to 30% by weight. Thus, the roux obtained by processing such a starting material having a low fats and oils content exhibits novel qualities. The novel qualities relate to characteristic taste and good flavor, and they are due to the completely uniform heating and kneading by the twin-screw extruder. Furthermore, the use of a twin-screw extruder, as in the present invention, is advantageous for producing roux containing spices, because the lower the fats and oils content of roux is, the better smell of spices roux emits. In addition, the texture of roux containing spices becomes very smooth and pleasant to the palate, owing to the strong effect of kneading and shearing of a twin-screw extruder.

The content of the farinaceous materials in the starting material used in the invention is not less than 5%, preferably 10 to 75%. If the content is less than 5%, it is not possible to impart the characteristic taste originating from the farinaceous materials to the resultant roux even if the starting material is processed by a twin-screw extruder. Therefore, the use of a specified amount of farinaceous materials is very important to effectively impart the characteristic taste originating therefrom to the resultant roux even when it is processed by a twin-screw extruder.

In the present invention, the foregoing ingredients are fed into a twin-screw extruder and heated and kneaded therein. The twin-screw extruder may be one capable of heating, kneading and shearing and optionally cooling and compressing materials to be processed and, for instance, may be an extruder having a barrel provided with two screws driven by an appropriate motor and having an appropriate heating means (and optionally a cooling means) disposed at the outer periphery of the barrel. The extruder usable in the present invention may be of any form or structure insofar as it meets the requirements for the functions mentioned above.

Examples of screws usable in the invention are the trapezoidal screw, ball screw, reverse screw, paddle screw and pin screw. These screws may be used alone or in combination depending on the purpose. In a preferred embodiment, reverse screws are disposed at least at one portion, preferably 1 to 3 portions, of the heating and kneading zone of the extruder.

In the method of this invention, the starting material for roux is fed to the barrel of the twin-screw extruder through an appropriate feeder. The starting materials are desirably supplied to the barrel in the ratio explained above and, for instance, it is possible to feed to the barrel a pasty starting material obtained by previously heating and mixing ingredients in a desired ratio using a kneader or the like. The ingredients can of course be separately supplied to the barrel.

The starting material fed into the twin-screw extruder is then heated and kneaded in the barrel of the extruder. This processing is carried out at a temperature of 60° to 220° C., preferably 90° to 150° C., for 25 seconds to 25 minutes, preferably 1 to 12 minutes. This is because if the processing temperature is less than 60° C., the smell and taste of raw farinaceous materials remain even after processing for more than 25 minutes, while if the temperature of the ingredients is more than 220° C., the resultant roux has the smell of burned ingredients, tastes bitter and browns even if the processing time is less than 25 seconds.

Thus, according to the present invention, roux which exhibits the characteristic taste and flavor obtainable with proper heating and which is also pleasant to the palate can be obtained under the processing conditions specified above.

In a preferred embodiment, the pressure in the barrel is controlled to between atmospheric pressure and 50 kg/cm$^2$ during heating and kneading the starting material. In addition, the number of revolutions of the screws is preferably set at 30 to 300 rpm. If the starting material is processed under such conditions, it can be kneaded while compressing and shearing the same. This leads to the production of roux which exhibits fine texture and is smooth and pleasant to the palate.

The heat-treated starting material may optionally be cooled down to an appropriate temperature by means of a cooling device disposed within or in series with the twin-screw extruder. The material may also be cooled down in a twin-screw extruder for cooling, which is connected to the twen-screw extruder for heating and kneading. The roux is generally cooled down to 30°–70° C., which is the range suitable for directly packaging the resultant roux in an appropriate container.

Thus, roux exhibiting good taste and flavor can effectively be obtained by continuously heating and kneading the starting material in the twin-screw extruder. Alternatively, all the operations, i.e., kneading and heating in a twin-screw extruder, cooling and packaging, may be carried out continuously in order to directly obtain packaged roux.

It is sufficient in the method of this invention to process the starting material mainly composed of fats and oils and farinaceous materials in a twin-screw extruder under the conditions specified above. However, if additives, such as spices, whose aromatic components easily deteriorate and/or dissipate are used, these components may preferably be added to the roux at a proper time in the course of heating or after heating. When adding these additives in the course of heating, they may be supplied through a feed opening disposed at the middle portion of the barrel of the extruder Thus, the method of the present invention makes it possible to easily produce roux having high quality within a very short period, while in the conventional method with a roasting kettle it is difficult to obtain roux exhibiting high quality, even if roux is heated for a quite long time and stirred continuously to ensure the uniformity of the roux Specifically speaking, in the method of this invention, the ingredients are processed in a closed system defined in the twin-screw extruder under specified conditions, so that the method of the invention makes it possible to suppress the deterioration and/or dissipation of aromatic components present in the ingredients, to process the ingredients uniformly and smoothly and to produce roux having good taste and flavor, at high yield Moreover, the procedures for processing the ingredients are very simple since all the desired functions such as heating, kneading, and optionally cooling and shearing of the starting material can be achieved only by a single step for processing the same in a twin-screw extruder In addition, the processing time for obtaining roux can be greatly reduced to the order of 25 seconds to 25 minutes. In accordance with the present invention, there can be obtained roux in various form such as solid, paste, granule and flake. The roux in form of granule or flake can be prepared by heating, kneading and granulating in the twin-screw extruder.

The method of the present invention will hereunder be explained in more detail with reference to the following non-limitative working examples. In the following Examples, the term "part(s)" means "part(s) by weight" unless otherwise specified.

EXAMPLE 1

50 Parts of soft flour, 20 parts of tallow, and 30 parts of butter were fed to a barrel of a twin-screw extruder and processed therein at 110° C. for 7 minutes (pressure in the barrel=5 kg/cm$^2$) to produce roux. The number of revolutions of the screws was 40 rpm.

The resultant roux exhibited high quality. In other words, it did not scorch, had a good creamy color and fine texture and was smooth and pleasant to the palate.

EXAMPLE 2

15 Parts of medium flour, 30 parts of palm oil, 10 parts of curry powder and 45 parts of other ingredients for seasoning were fed to the heating zone of the barrel of a twin-screw extruder and processed at 145° C. for one minute and 20 seconds (pressure in the barrel 2 kg/cm$^2$). Then, the processed ingredients were passed through a die for cooling disposed at the end of the barrel to cool the ingredients to 60° C. and transferred to a hopper of a filling machine to pack the resultant roux in containers and seal them. Thus, curry roux packed in containers was produced. In this case, the number of revolutions of the screws was 160 rpm.

Curry was prepared from the roux thus produced according in the ordinary manner. This curry had high quality, since it exhibited the characteristic taste and flavor of curry.

What is claimed is:

1. A method for producing roux comprising heating and kneading a starting material comprised of fats and oils and farinaceous materials in a twin-screw extruder at a temperature of 90° to 150° C. for 1 to 12 minutes, at least one of a reverse screw and a paddle screw being disposed at least at one portion of a heating and kneading zone of the twin-screw extruder, the amount of fats and oils in the starting material being 15 to 50% by weight.

2. A method for producing roux according to claim 1 wherein the amount of the fats and oils in the starting material is 15 to 30% by weight.

3. A method for producing roux according to claim 1 wherein the amount of the fats and oils in the starting material is 18 to 45% by weight.

4. A method for producing roux according to claim 1 wherein the amount of the farinaceous materials in the starting material is not less than 5% by weight.

5. A method for producing roux according to claim 4 wherein the amount of the farinaceous materials in the starting material is 10 to 75% by weight.

6. A method for producing roux according to claim 1 wherein the number of revolution of screws is controlled between 30 and 300 rpm during the heating and kneading process of the starting material in the twin-screw extruder.

7. A method for producing roux according to claim 1 wherein a reverse screw is disposed at 1 to 3 portions of the heating and kneading zone of the twin-screw extruder.

8. A method for producing roux according to claim 1 wherein the pressure is controlled between atmospheric pressure and 50 kg/cm$^2$ during the heating and kneading of the starting material in the twin-screw extruder.

9. A method for producing roux according to claim 1 wherein a cooling device is disposed within the twin-screw extruder.

10. A method for producing roux according to claim 9 wherein the starting material is cooled down to 30°-70° C. by the cooling device subsequent to heating and kneading in the twin-screw extruder.

11. A method for producing roux according to claim 1 wherein the twin-screw extruder for heating and kneading is connected to a twin-screw extruder for cooling.

12. A method for producing roux according to claim 11 wherein the starting material is cooled down to 30°-70° in the twin-screw extruder for cooling subsequent to heating and kneading in the twin-screw extruder therefor.

13. A method for producing roux according to claim 1 wherein the starting material is fed into the twin-screw extruder in the form of a pasty material obtained by previously heating and mixing ingredients.

14. A method for producing roux according to claim 1 wherein ingredients whose aromatic components easily at least one of deteriorate and dissipate are fed into the twin-screw extruder in the course of heating and kneading or after heating and kneading.

15. A method for producing roux according to claim 4 wherein the ingredients are fed, int eh course of heating, into a feed opening disposed at the middle portion of a barrel of the extruder.

* * * * *